April 1, 1958 C. G. HOLDERITH ET AL 2,829,326
ELECTRIC MOTOR CONTROL SYSTEM
Filed June 1, 1954 2 Sheets-Sheet 2
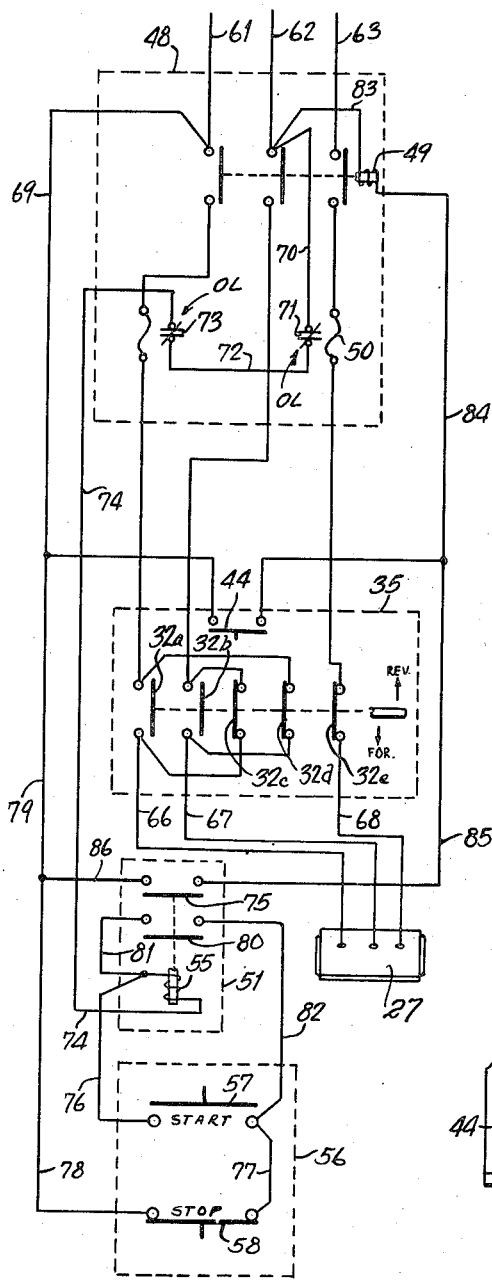
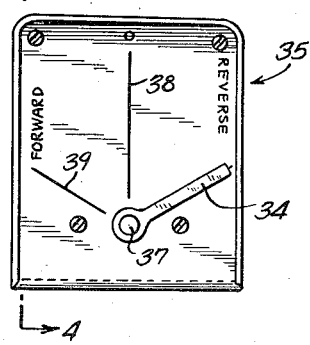
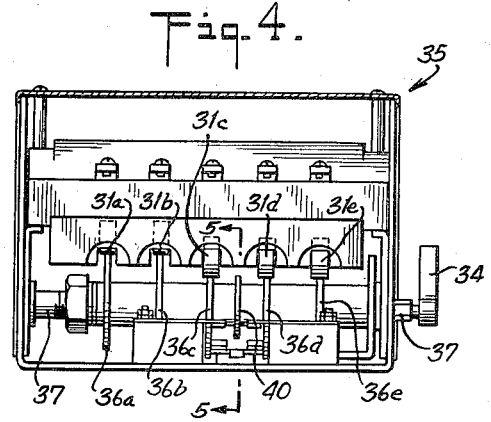
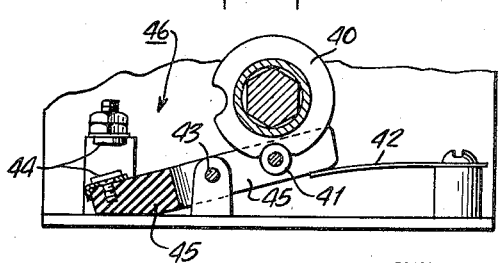
INVENTORS
CHARLES G. HOLDERITH
BY WILLIAM J. HOLDERITH
W. D. Keith,
ATTORNEY United States Patent Office 2,829,326
Patented Apr. 1, 1958

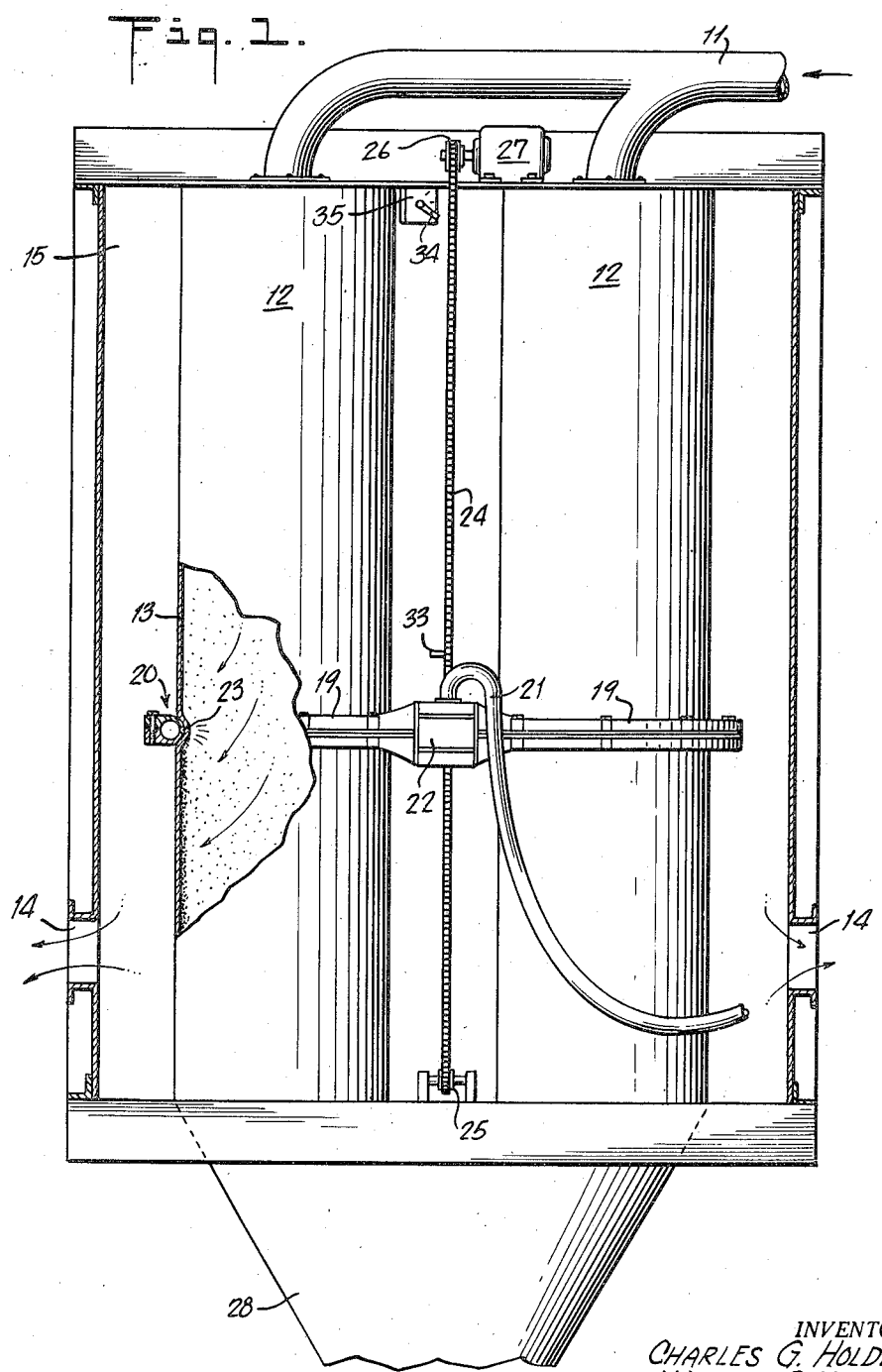

2,829,326

ELECTRIC MOTOR CONTROL SYSTEM

Charles G. Holderith, Florham Park, and William J. Holderith, Fair Lawn, N. J., assignors to Metals Disintegrating Company, Inc., Union County, N. J., a corporation of New Jersey Application June 1, 1954, Serial No. 433,481

8 Claims. (Cl. 318—282)

This invention is concerned with an electric motor control system. More specifically, the invention deals with an electric motor control system for apparatus that is continously driven reversably between two limiting positions.

It has been found that where electric motor driven apparatus operates in a continuous manner with a reversal at two limiting positions, and the elements involved have considerable inertia in the driven parts, difficulty has been encountered in certain situations with regard to the limiting positions of the apparatus, i. e. at the point where a reversal of motion takes place from one direction to the other.

For efficient operation and to obtain a system that is practical, it has been found that the electric motor which drives the apparatus between two limits of travel may be used as a dynamic braking device in order to arrest the motion in a given direction as quickly as possible so as to save time and avoid wasted space in the apparatus. Since, the apparatus operates in a continuous manner so long as it is energized, the desired braking effect is gained by means of plugging rather than mere dynamic braking. The term "plugging" means applying reverse power to the motor. Obviously this is a very effective and rapid way of stopping the motor and any connected load, preparatory to driving in the reverse direction. However, as mentioned above, certain difficulties have been encountered in practice, and it is these difficulties which this invention overcomes.

Although this invention may be applied to any size apparatus, it is usually applicable to a machine where the electric motor involved is one of such a size that its control is effectuated by means of a remote control, solenoid-operated switch. The reversal of the motor, on the other hand, may be effectuated by solely mechanical means acting upon the structure of a reversing switch.

In any case, it has been found that a serious situation may develop that is very difficult to avoid, because of the failing of human operators to observe the condition of the apparatus at the exact time when it is to be deenergized, or because the apparatus is obscured from view. For this reason it is quite possible that the main energization for the motor may be switched off at a time when the apparatus is close to one of its limits of travel and traveling toward such limit. When this situation exists the apparatus tends to overtravel and crash against its "end position" with resulting damage to various elements of the apparatus.

Furthermore, there are two other situations that are overcome by this invention. One of these situations is that where the line switch to deenergize the apparatus is actuated at such a time that the apparatus coasts up to its limit of travel just far enough to throw the reversing switch only half way, i. e. into its neutral or circuit-open position. Following this condition, when it is attempted to restart the apparatus, as by pressing the manual start button, the line to the motor is still open (because of the neutral position of the reverse switch) and consequently, it is not possible to start the apparatus without going inside the machinery and manually setting the reversing switch off its neutral position.

Another of the difficulties which might arise is involved in the situation where the power to the motor is shut off just before the apparatus reaches a limit of travel so that the inertia carries the trip mechanism for the reversing switch entirely past the reversing arm of the switch. Now, when the apparatus is restarted, although it begins to run in the proper direction (away from its limiting position) the reversing switch is almost immediately tripped again to its opposite position, causing the apparatus to reverse and run "power on" against the end or limiting position from which it was just recovering.

Consequently, it is an object of this invention to provide an electric circuit having means for avoiding overtravel and damage at the limiting positions of an apparatus that is continuously driven in two directions between a pair of limiting positions.

Another object of this invention is to provide means whereby a reversing switch that is employed for plugging effect to avoid overtravel beyond given limiting positions may be maintained effectively in the motor circuit that is kept energized within a given distance of reversing positions of the motor.

Briefly, the invention involves a cyclically-operating motor driven apparatus wherein the motor is positively connected to the apparatus, and wherein the motor and apparatus reverse in direction after a predetermined travel in each direction. The system comprising reversing switch means for reversing the operation of said motor, line switch means for starting and stopping said motor, means for controlling said line switch means remotely, and means for preventing the opening of said line switch as the apparatus reaches a predetermined distance from either end of the travel so that the motor will remain energized until reversal has taken place and the apparatus has been braked by plugging action in the motor circuit so as to avoid overtravel at either end of the travel of the apparatus.

A specific embodiment of the invention is described below in connection with the drawings where like reference numbers refer to like parts throughout, and wherein:

Fig. 1 is an elevation partly in cross-section showing a filter-type mechanism employing a motor drive that uses the control circuit of this invention;

Fig. 2 is a circuit diagram showing the circuit according to one embodiment of this invention;

Fig. 3 is an end elevation of a lever-arm actuated reversing switch that is modified in accordance with this invention;

Fig. 4 is a side elevation of the same reversing switch taken along the line 4—4 of Fig. 3; and Fig. 5 is an enlarged detail view taken along the line 5—5 of Fig. 4.

In Fig. 1 there is illustrated one particular apparatus with which the motor controlled circuit of this invention may be employed. The illustrated apparatus consists of a multiple unit filtering device which may be employed to recover particles of solid matter from air or any gas. The purpose may be either to recover the suspended foreign matter or merely to filter out such matter from the gas or air, as desired. In filtering apparatus of this type, the solid particles that are being filtered tend to gather on the inner surface of the filter material and build up an impervious layer thereon. To avoid this difficulty, a machine such as that illustrated may be used. It employs a reverse stream of air being blown back through the filter material in reverse, so as to loosen the layer of filtered matter gathering on the inside of the filter. The loosened solid particles may then fall down below the filter to be recovered or disposed of as desired. The air, or other gas containing suspended solid matter, is blown through an inlet pipe 11 which divides and is attached to the top of each of a plurality of filter elements 12 that are in the shape of cylinders which are constructed of a pressed wool felt. The air then passes through the felt walls 13 of the cylindrical filters 12 and is carried out through a plurality of outlet ports 14 located in the walls of a chamber 15 which contains the filter elements 12. The solid particles which were suspended in the air are filtered out on the inner surface of walls 13 of the cylinders 12 and soon tend to build up a more and more impervious layer of solid particles, were it not for the apparatus now to be described.

There is a set of hollow rings 19, one for each of the cyindrical filter elemetns 12. Each ring 19 has an inside diameter somewhat less than the outside diameter of the corresponding filter 12. Consequently the felt cylinders 12 are slightly deformed as shown in the fragmentary cross-section view at 20, so that intimate contact is maintained between the walls of filters 12 and the inside of the rings 19.

There is a flexible tube 21 through which high pressure air is introduced to the inside of rings 19. It is connected to the rings 19 by means of a manifold 22. On the inner diameter of each of the rings 19 there is a series of slits or similar openings 23 through which the air under pressure within the rings 19 will be directed. The rings 19 are suspended within the chamber 15 by any convenient structure (not shown) for vertical movement up and down the full length of the cylindrical filter elements 12. This movement is effectuated by means of a chain drive including a chain 24 that runs over an idler pulley 25 and a driven pulley 26 attached to the shaft of an electric motor 27. It will be observed that by introducing air pressure within the rings 19 that is sufficiently in excess of the pressure of the air being filtered, a localized jet of air is driven through the slits 23 and passes through the felt walls 13 of the filter elements 12 so as to blow off any accumulation of solid material that has been filtered out of the air being filtered. This solid matter as loosened will then fall down vertically inside the hollow central space of the filter elements 12 and may be gathered for use or disposal by having openings in the chamber 15 at the bottom of each filter 12 and by means of a hopper 28 located below the filters 12.

During the operation of the apparatus for filtering the air and/or recovering the solid particles, the multiple ring unit including rings 19 and driving chain 24 will be driven up and down from the top to the bottom of the filter cylinders 12. In order to cause the reversal, as rings 19 reach the top and bottom of the cylinders 12, there is a pair of pins 33 attached to the chain 24 so as to make contact with a lever arm 34 which is attached to, and actuates, a reversing switch 35 for the motor 27. Only one of the pins 33 is shown in Fig. 1 to avoid confusion.

Referring to Figs. 3 and 4, it will be observed that the structure of the reversing switch 35 is at least partially conventional. The illustrated switch is for use with a three phase motor and employs five sets of contacts 32a–32e (Fig. 2) which are actuated by five rollers 31a–31e respectively. The rollers in turn are actuated by means of a group of cams 36a–36e, each of which is securely fastened to a shaft 37 for rotation therewith. The shaft 37 is positioned in rotation by means of the arm 34 that is keyed to or otherwise fastened for rotation with the shaft 37. It is to be noted that the arm 34 has a neutral position indicated by a line 38 on the face of the housing for switch 35. Although in any given mechanism where this invention is employed there will be various ways to mount the reversing switch 35, especially since the relative position of the shaft 37 and the arm 34 could be changed; in the present embodiment of this invention, the switch 35 is mounted on its side so that the arm 34, when in its neutral position is horizontal. It will be noted that the forward position for the arm 34 of the switch 35 is indicated generally by a line 39 on the face of the switch housing.

For a purpose that will be more fully set forth in connection with a description of the electric circuit, there is an additional cam 40 that has a cam follower 41 (Fig. 5) spring biased into contact with the surface of cam 40 by means of a leaf spring 42. Spring 42 acts upon the two ends of a bifurcated rocker arm 45 of an auxiliary switch 46 which is incorporated within the structure of reversing switch 35. Rocker arm 45 is pivoted at 43 and acts to close a set of contacts 44. It is to be noted that the cam 40 has a shape such that switch contacts 44 will be open when the lever arm 34 of the switch 35 is in either of its two extreme positions, i. e. forward or reverse, while in between these two positions the contacts 44 will be closed.

The electric circuit is illustrated in Fig. 2 and includes a solenoid-operated line switch 48 which is spring biased to an open position as illustrated and has a solenoid 49 and also may include a pair of fuses 50, one for each of two of the three phase circuits. The reversing switch 35 is schematically shown in the circuit diagram by a dotted line, and in addition there is a relay 51 having a plurality of contacts and a solenoid 55 for actuation thereof, and being spring biased to an open position as illustrated. There is a manual switch 56 that includes start contacts 57 and stop contacts 58, each of which is spring biased to the open and closed positions illustrated, respectively. There are three main line wires 61, 62, 63, which are connected to a three phase source of power (not shown) and are interrupted by the contacts of line switch 48. The circuits of the three lines are transposed for effective reversal of motor 27 by means of the reversing switch 35. This transposition is accomplished via the plainly illustrated circuits involving the sets of contacts 32a–32d of the reversing switch 35. The cams 36a–36e are so shaped that at neutral position of the arm 34 all the contacts 32a–32e are open. When the arm 34 is pivoted to forward position, sets of contacts 32a, 32b and 32e will be closed, and when the arm 34 is in the reverse position, contacts 32c, 32d and 32e will be closed as illustrated in Fig. 2. As indicated above, the auxiliary set of contacts 44 will be open when the arm 34 is in either forward or reverse position but will be closed in all positions of the arm between these two extremes. The wires 66, 67 and 68 lead from the reversing switch 35 to the motor 27.

*Operation*

When standing at rest the reversing switch 35 will be in either forward or reverse position and the line switch 48 will be open as illustrated in Fig. 2. The operator will then press the start button closing contacts 57 and the relay 51 will be energized over a circuit from the line wires 61 and 62 as follows: Beginning at line wire 62 going over a wire 70 to an overload protector 71 (marked OL), then over a wire 72 to another protector 73 (also marked OL), then over wire 74 to one side of solenoid 55. Continuing from the other side of solenoid 55 the circuit goes via a wire 76 to now closed start contacts 57, and then over a wire 77 to closed stop contacts 58 and then via wires 78, 79 and 69 to line wire 61.

Energization of relay 51 causes its contacts 75 and 80 to be closed. Contacts 80 close a holding circuit for the relay 51 by completing an alternate path for energizing the solenoid 55 from the other side (from that connected to line wire 62) over wires 81 and 82 to the wire 77 and on to line wire 61 via the stop switch contacts 58. While contacts 75 close a circuit to energize line switch solenoid 49. This circuit may be traced from line wire 62 over a wire 83 to one side of solenoid 49, and from the other side of the solenoid 49 over wire 84, wire 85, now closed contacts 75, wire 86, wire 79, wire 69 to line wire 61. The line switch 48 then remains closed and the mechanism runs continuously with reversals in direction taking place as the reversing switch 35 is actuated from one position to the other. The reversal of switch 35 is caused by one of the pins 33 making contact with lever arm 34 and throwing the switch 35 to its opposite position. This then causes the plugging effect mentioned above so that the motor 27 is rapidly braked from its rotation in one direction and started rotating under power in the opposite direction.

In order to guard against the difficulties and dangers pointed out above, the following action takes place at either end of the travel of the rings 19 from top to bottom of the filter units 12. During the travel of the apparatus from the point where one of the pins 33 makes contact with the lever arm 34 until the lever arm 34 has reached its opposite position, line switch 48 cannot be opened by manually depressing the stop button 58 because of the following circuits: Beginning at line wire 61 and traveling over auxiliary circuit wire 69 to contacts 44 which are now closed, continuing over wire 84 to one side of solenoid 49. Then from the other side of solenoid 49 over wire 83 to line wire 62. Consequently, so long as the contacts 44 are closed, it is immaterial whether relay 51 is actuated or not since contacts 44 are in parallel with contacts 75 of the relay 51. Therefore, the desired effect of a plugging operation for reversing the motor 27 with power on, cannot be lost by means of manually opening the stop button as the apparatus reaches the limiting position where either of the pins 33 makes contact with and moves the lever arm 34 of the reversing switch 35. For this reason the apparatus will always have power on completely through a reversal with ample plugging action on the motor to effect the braking of the travel toward its limiting position, and so leave the mechanism safely stopped at the limit of travel with the circuits set to begin operation in a direction away from the limiting position. Furthermore the possibility of having a manual stop effected at a time such that the rings 19 and active pin 33 would coast to rest with the reversing switch 35 in its neutral position is entirely obviated by this same action of auxiliary switch contacts 44 that maintain the line switch 48 closed until the lever arm 34 has been moved all the way to its opposite position, i. e. from forward position to reverse position or vice versa.

To additionally clarify the operation it is to be noted that the operation of the circuits will be as follows during a critical portion of the operation of the mechanism when the manual stop switch contacts 58 are opened: If the pin 33 has contacted or does contact the arm 34 as the stop contacts 58 are opened, the opening of contacts 58 will break the holding circuit for solenoid 55 of relay 51 and the contacts 75 and 80 will be opened by the spring bias of this relay. Opening of contacts 75 would deenergize solenoid 49 of line switch 48, but because auxiliary contacts 44 are closed the solenoid 49 will remain energized until the reversing switch 35 has been fully thrown. This action then, gives ample application of reverse energization to the motor 27 to overcome the inertia of all the connected elements and so avoid all difficulties heretofore encountered.

By way of specific example to illustrate the size of the filtering machinery with which this invention is illustrated herein, it is pointed out that the filter elements 12 are made in lengths varying between three and twenty feet with the majority being about ten feet long. The critical distance from the limits of travel of the rings 19 for avoiding the difficulties mentioned above will itself vary somewhat, depending upon the weight and size of the rings 19, etc. However, such critical distance will ordinarily be about six or eight inches of travel of a pin 33 before it makes contact with the lever arm 34 of the reversing switch 35.

It will be appreciated that in addition to the line switch 48 described herein, there may be provided an additional switch in the power lines ahead of switch 48 so that the entire apparatus may be deenergized.

While there has been described a specific embodiment of the invention in accordance with the applicable statutes, this is to be taken as merely illustrative and in no way as limiting the scope of this invention.

It is claimed:

1. In a cyclically operating electric motor driven apparatus wherein the motor is positively connected to the apparatus, and wherein the motor and apparatus reverse direction after a predetermined travel in each direction, a motor control circuit comprising reversing switch means for reversing the operation of said motor, line switch means for closing and opening the entire motor energization supply circuit in order to control starting and stopping said motor, means for controlling said line switch means remotely, and means associated with said reversing switch means for preventing the opening of said line switch as the apparatus reaches a predetermined distance from either end of the travel so that the motor will remain energized until reversal has taken place and the apparatus has been braked by plugging action in the motor circuit so as to avoid overtravel at either end of travel of the apparatus.

2. In a cyclically operating electric motor driven apparatus wherein the motor is positively connected to the apparatus, and wherein the motor and apparatus reverse direction after a predetermined travel in each direction, a motor control circuit comprising reversing switch means for plugging and reversing the operation of said motor, solenoid operated line switch means for closing and opening the entire motor energization supply circuit in order to control starting and stopping said motor, relay means for controlling said solenoid operated line switch, and means associated with said reversing switch means for controlling said solenoid operated line switch when said reversing switch is being actuated in order to avoid overtravel at the limits of travel of said apparatus.

3. In a cyclically operating electric motor driven apparatus wherein the motor is positively connected to the apparatus, and wherein the motor and apparatus reverse direction after a predetermined travel in each direction, a motor control circuit comprising solenoid operated line switch means for starting and stopping said motor, relay means for controlling said solenoid operated line switch, manually operable start and stop switches, reversing switch means for plugging and reversing the operation of said motor, first circuit means including said relay means and said start and stop switches, second circuit means including the solenoid of said line switch means and contacts of said relay means, cam operated switch means actuated in conjunction with said reversing switch means, and third circuit means including said cam operated switch means and the solenoid of said line switch means so that overtravel and consequent damage to the apparatus is prevented.

4. In combination, an electric motor, first switch means for periodically reversing said motor, said first switch means having two extreme positions, second switch means for controlling the energization of said motor, said second switch means being solenoid operated, relay means for controlling energization of said solenoid, manually operated start stop switches for controlling operation of said relay means, and third switch means operated in conjunction with said first switch means for also controlling operation of said solenoid so that said motor cannot be deenergized while the first switch means is in between its two extreme positions and consequently the plugging action of the motor reversal while energized will always be effective.

5. In combination, a three phase electric motor, first switch means for periodically reversing said motor, said first switch means having two extreme positions, second switch means for controlling the energization of said motor, said second switch means being solenoid operated, relay means for controlling energization of said solenoid, manually operated start stop switches for controlling operation of said relay means, means associated with the load driven by said motor for actuating said first switch means, and third switch means operated in conjunction with said first switch means for also controlling operation of said solenoid so that said motor cannot be deenergized while the first switch means is in between its two extreme positions and consequently the plugging action of the motor reversal while energized will always be effective.

6. In combination, a reversing switch having a neutral circuit opening position, a solenoid operated line switch being spring biased to open position, a relay for controlling said solenoid operated line switch, a pair of manually operated switches for controlling operation of said relay, an auxiliary switch actuated in accordance with said reversing switch, and circuit means including said auxiliary switch and said solenoid for maintaining the solenoid energized throughout the actuation of said reversing switch so that the motor cannot be deenergized by the neutral position of the reversing switch.

7. In combination, a three phase electric motor, a reversing switch having a neutral circuit opening position, means driven by the motor for actuating said reversing switch, a solenoid operated line switch being spring biased to open position, a relay for controlling said solenoid operated line switch, a pair of manually operated switches for controlling operation of said relay, a cam operated auxiliary switch actuated by said reversing switch, and circuit means including said auxiliary switch and said solenoid for maintaining the solenoid energized throughout the actuation of said reversing switch so that the motor cannot be deenergized by the neutral position of the reversing switch.

8. In an electric motor control system having an electric motor, first switch means for periodically reversing said motor, said first switch means having two extreme positions, second switch means including a solenoid for actuation thereof, said second switch means being connected in the main line for controlling energization of said motor, relay means for controlling energization of said solenoid, and manually operable start stop switches for controlling operation of said relay means, the improvement comprising a third switch means actuated by said first switch means while the latter is in between its two extreme positions for maintaining said solenoid in a state of actuation of said second switch means such that the motor remains energized throughout the intermediate positioning of said first switch means irrespective of the condition of said manually operable start stop switches.

References Cited in the file of this patent

UNITED STATES PATENTS

| | | |
|---|---|---|
| 876,441 | Date | Jan. 14, 1908 |
| 1,141,154 | Tatum | June 1, 1915 |
| 2,376,658 | Charbonneau et al. | May 22, 1945 |

FOREIGN PATENTS

| | | |
|---|---|---|
| 673,886 | Great Britain | June 11, 1952 |